(12) United States Patent
Cummiskey et al.

(10) Patent No.: US 7,970,345 B2
(45) Date of Patent: Jun. 28, 2011

(54) SYSTEMS AND METHODS OF WAVEFORM AND/OR INFORMATION SPLITTING FOR WIRELESS TRANSMISSION OF INFORMATION TO ONE OR MORE RADIOTERMINALS OVER A PLURALITY OF TRANSMISSION PATHS AND/OR SYSTEM ELEMENTS

(75) Inventors: J. Terence Cummiskey, Reston, VA (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1010 days.

(21) Appl. No.: 11/472,079

(22) Filed: Jun. 21, 2006

(65) Prior Publication Data

US 2007/0015460 A1 Jan. 18, 2007

Related U.S. Application Data

(60) Provisional application No. 60/692,758, filed on Jun. 22, 2005.

(51) Int. Cl.
*H04B 7/185* (2006.01)
(52) U.S. Cl. ............ 455/12.1; 342/352; 342/2; 370/316
(58) Field of Classification Search .................. 455/12.1
See application file for complete search history.

(56) References Cited

U.S. PATENT DOCUMENTS

| | | | |
|---|---|---|---|
| 4,901,307 A | 2/1990 | Gilhousen et al. | |
| 5,014,061 A * | 5/1991 | Ghose | 342/45 |
| 5,073,900 A | 12/1991 | Mallinckrodt | |
| 5,274,839 A * | 12/1993 | Kularajah et al. | 455/12.1 |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A * | 9/1996 | Dent | 370/319 |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Yuwen Pan
*Assistant Examiner* — Hai V Nguyen
(74) *Attorney, Agent, or Firm* — Myers Bigel Sibley & Sajovec

(57) ABSTRACT

Methods of transmitting an information signal in a satellite communications system include splitting the information signal into a first signal component and a second signal component, transmitting the first signal component to a first system element of the satellite communications system, transmitting the second signal component to a second system element of the satellite communications system, combining the first signal component and the second signal component to form a combined signal, and recovering the information signal from the combined signal. Related systems and components are also disclosed.

13 Claims, 7 Drawing Sheets

U.S. PATENT DOCUMENTS

| | | | |
|---|---|---|---|
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,642,358 A * | 6/1997 | Dent | 370/323 |
| 5,666,653 A * | 9/1997 | Ahl | 370/330 |
| 5,734,962 A * | 3/1998 | Hladik et al. | 455/12.1 |
| 5,754,600 A * | 5/1998 | Rahnema | 375/341 |
| 5,761,605 A | 6/1998 | Tawil et al. | |
| 5,765,098 A | 6/1998 | Bella | |
| 5,778,139 A * | 7/1998 | Kim | 386/81 |
| 5,796,715 A * | 8/1998 | Patterson et al. | 370/349 |
| 5,796,760 A * | 8/1998 | Wiedeman et al. | 375/130 |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,859,874 A * | 1/1999 | Wiedeman et al. | 375/267 |
| 5,864,546 A * | 1/1999 | Campanella | 370/316 |
| 5,878,324 A * | 3/1999 | Borth et al. | 725/62 |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,925,092 A * | 7/1999 | Swan et al. | 701/226 |
| 5,926,758 A | 7/1999 | Grybos et al. | |
| 5,937,332 A | 8/1999 | Karabinis | |
| 5,940,753 A | 8/1999 | Mallinckrodt | |
| 5,947,051 A * | 9/1999 | Geiger | 114/313 |
| 5,991,345 A | 11/1999 | Ramasastry | |
| 5,995,832 A | 11/1999 | Mallinckrodt | |
| 6,005,855 A * | 12/1999 | Zehavi et al. | 370/335 |
| 6,011,951 A | 1/2000 | King et al. | |
| 6,014,366 A * | 1/2000 | Ichiyoshi | 370/210 |
| 6,023,239 A * | 2/2000 | Kovach | 342/357.44 |
| 6,023,605 A | 2/2000 | Sasaki et al. | |
| 6,028,861 A * | 2/2000 | Soirinsuo et al. | 370/225 |
| 6,049,566 A * | 4/2000 | Saunders et al. | 375/220 |
| 6,052,560 A | 4/2000 | Karabinis | |
| 6,052,586 A | 4/2000 | Karabinis | |
| 6,055,431 A * | 4/2000 | Dybdal | 455/450 |
| 6,061,023 A * | 5/2000 | Daniel et al. | 342/354 |
| 6,064,859 A * | 5/2000 | Leopold et al. | 455/13.1 |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,151,497 A * | 11/2000 | Yee et al. | 455/430 |
| 6,154,501 A * | 11/2000 | Friedman | 375/260 |
| 6,157,642 A * | 12/2000 | Sturza et al. | 370/389 |
| 6,157,811 A | 12/2000 | Dent | |
| 6,157,834 A | 12/2000 | Helm et al. | |
| 6,160,994 A * | 12/2000 | Wiedeman | 455/12.1 |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,961 B1 * | 3/2001 | Schindall et al. | 455/430 |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,263,466 B1 * | 7/2001 | Hinedi et al. | 714/755 |
| 6,324,405 B1 | 11/2001 | Young et al. | |
| 6,339,707 B1 | 1/2002 | Wainfan et al. | |
| 6,341,213 B1 * | 1/2002 | Wu | 455/12.1 |
| 6,363,263 B1 * | 3/2002 | Reudink et al. | 455/562.1 |
| 6,381,225 B1 * | 4/2002 | Chockalingam et al. | 370/316 |
| 6,418,147 B1 | 7/2002 | Wiedeman | |
| 6,426,959 B1 * | 7/2002 | Jacobson et al. | 370/468 |
| 6,442,385 B1 * | 8/2002 | Marko | 455/427 |
| 6,448,925 B1 * | 9/2002 | Shridhara | 342/357.02 |
| 6,449,461 B1 | 9/2002 | Otten | |
| 6,452,989 B1 * | 9/2002 | Friedman | 375/347 |
| 6,490,296 B2 * | 12/2002 | Shenoi et al. | 370/469 |
| 6,522,865 B1 | 2/2003 | Otten | |
| 6,531,982 B1 * | 3/2003 | White et al. | 342/357.09 |
| 6,549,582 B1 * | 4/2003 | Friedman | 375/260 |
| 6,553,021 B1 * | 4/2003 | Bishop et al. | 370/347 |
| 6,606,349 B1 * | 8/2003 | Kudhrethaya et al. | 375/150 |
| 6,609,002 B1 * | 8/2003 | Krishnamurthy et al. | 455/428 |
| 6,628,919 B1 | 9/2003 | Curello et al. | |
| 6,633,745 B1 * | 10/2003 | Bethscheider | 455/12.1 |
| 6,657,978 B1 * | 12/2003 | Millman | 370/316 |
| 6,661,975 B1 * | 12/2003 | Hall et al. | 398/180 |
| 6,684,057 B2 | 1/2004 | Karabinis | |
| 6,693,953 B2 * | 2/2004 | Cox et al. | 375/141 |
| 6,708,029 B2 * | 3/2004 | Wesel | 455/428 |
| 6,735,437 B2 | 5/2004 | Mayfield et al. | |
| 6,738,434 B2 * | 5/2004 | Friedman | 375/316 |
| 6,775,251 B1 | 8/2004 | Wiedeman et al. | |
| 6,778,136 B2 * | 8/2004 | Gronemeyer | 342/357.15 |
| 6,785,543 B2 | 8/2004 | Karabinis | |
| 6,785,656 B2 * | 8/2004 | Patsiokas et al. | 704/500 |
| 6,798,791 B1 * | 9/2004 | Riazi et al. | 370/515 |
| 6,807,648 B1 * | 10/2004 | Cansever et al. | 714/776 |
| 6,823,169 B2 * | 11/2004 | Marko et al. | 455/3.02 |
| 6,823,170 B1 * | 11/2004 | Dent | 455/13.3 |
| 6,856,787 B2 | 2/2005 | Karabinis | |
| 6,859,652 B2 | 2/2005 | Karabinis et al. | |
| 6,865,238 B2 * | 3/2005 | Friedman | 375/295 |
| 6,868,316 B1 * | 3/2005 | Stevens | 701/13 |
| 6,870,882 B1 * | 3/2005 | Al-Dhahir et al. | 375/233 |
| 6,879,829 B2 | 4/2005 | Dutta et al. | |
| 6,892,068 B2 | 5/2005 | Karabinis et al. | |
| 6,892,131 B2 * | 5/2005 | Coffee et al. | 701/200 |
| 6,895,059 B2 * | 5/2005 | Rogerson et al. | 375/295 |
| 6,937,857 B2 | 8/2005 | Karabinis | |
| 6,944,139 B1 * | 9/2005 | Campanella | 370/315 |
| 6,954,440 B2 * | 10/2005 | Gerakoulis | 370/320 |
| 6,965,816 B2 * | 11/2005 | Walker | 701/16 |
| 6,975,837 B1 | 12/2005 | Santoru | |
| 6,983,411 B2 * | 1/2006 | Tsuchie | 714/751 |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,119 B2 * | 5/2006 | Friedman | 375/260 |
| 7,039,400 B2 | 5/2006 | Karabinis et al. | |
| 7,058,086 B2 * | 6/2006 | Marko | 370/477 |
| 7,062,267 B2 | 6/2006 | Karabinis | |
| 7,068,616 B2 * | 6/2006 | Chang et al. | 370/316 |
| 7,079,020 B2 * | 7/2006 | Stilp | 340/506 |
| 7,084,756 B2 * | 8/2006 | Stilp | 340/539.1 |
| 7,092,708 B2 | 8/2006 | Karabinis | |
| 7,103,317 B2 * | 9/2006 | Chang et al. | 455/66.1 |
| 7,113,505 B2 * | 9/2006 | Williams | 370/370 |
| 7,136,640 B2 * | 11/2006 | Marko | 455/428 |
| 7,167,704 B2 * | 1/2007 | Chang et al. | 455/431 |
| 7,181,162 B2 * | 2/2007 | Chang et al. | 455/13.1 |
| 7,231,178 B2 * | 6/2007 | Friedman et al. | 455/12.1 |
| 7,251,281 B2 * | 7/2007 | Marko et al. | 375/260 |
| 7,269,223 B2 * | 9/2007 | Learned et al. | 375/259 |
| 7,277,797 B1 * | 10/2007 | Kunitsyn et al. | 702/15 |
| 7,305,211 B2 * | 12/2007 | Dent | 455/12.1 |
| 7,321,601 B2 * | 1/2008 | Rogerson et al. | 370/478 |
| 7,324,056 B2 * | 1/2008 | Wesel | 343/766 |
| 7,327,691 B2 * | 2/2008 | Abousleman et al. | 370/248 |
| 7,342,973 B2 * | 3/2008 | Walker et al. | 375/260 |
| 7,352,822 B2 * | 4/2008 | Oshima | 375/261 |
| 7,376,108 B2 * | 5/2008 | Lansio et al. | 370/338 |
| 7,395,056 B2 * | 7/2008 | Petermann | 455/422.1 |
| 7,400,857 B2 * | 7/2008 | Chang et al. | 455/12.1 |
| 7,403,575 B2 * | 7/2008 | Gehring et al. | 375/308 |
| 7,406,311 B2 * | 7/2008 | Marko | 455/428 |
| 7,409,010 B2 * | 8/2008 | McHenry | 375/296 |
| 7,423,987 B2 * | 9/2008 | Anderson et al. | 370/316 |
| 7,436,899 B2 * | 10/2008 | Rogerson et al. | 375/295 |
| 7,450,963 B2 * | 11/2008 | Krishnan et al. | 455/557 |
| 7,551,671 B2 * | 6/2009 | Tyldesley et al. | 375/240 |
| 7,551,921 B2 * | 6/2009 | Petermann | 455/422.1 |
| 7,558,250 B2 * | 7/2009 | Little | 370/352 |
| 7,573,807 B1 * | 8/2009 | Riazi et al. | 370/210 |
| 7,606,526 B2 * | 10/2009 | Patsiokas et al. | 455/3.02 |

| | | | |
|---|---|---|---|
| 7,690,021 B2* | 3/2010 | Ng et al. ........................ 725/91 |
| 2002/0101632 A1* | 8/2002 | Meckler ........................ 359/115 |
| 2002/0122408 A1 | 9/2002 | Mullins |
| 2002/0132579 A1* | 9/2002 | Hart et al. .................... 455/12.1 |
| 2002/0146010 A1* | 10/2002 | Shenoi et al. ............. 370/395.1 |
| 2002/0146979 A1 | 10/2002 | Regulinski et al. |
| 2002/0151273 A1* | 10/2002 | Marko ........................ 455/12.1 |
| 2002/0159399 A1* | 10/2002 | Stephenson .................. 370/281 |
| 2002/0168971 A1* | 11/2002 | Parkman ...................... 455/427 |
| 2002/0177465 A1 | 11/2002 | Robinett |
| 2002/0194343 A1* | 12/2002 | Shenoi et al. ................. 709/227 |
| 2002/0196842 A1* | 12/2002 | Onggosanusi et al. ....... 375/148 |
| 2002/0196869 A1* | 12/2002 | Friedman ..................... 375/316 |
| 2003/0003815 A1 | 1/2003 | Yamada |
| 2003/0003899 A1* | 1/2003 | Tashiro et al. ................ 455/414 |
| 2003/0022625 A1 | 1/2003 | Otten et al. |
| 2003/0031265 A1* | 2/2003 | Friedman ..................... 375/260 |
| 2003/0032391 A1* | 2/2003 | Schweinhart et al. ....... 455/12.1 |
| 2003/0050015 A1* | 3/2003 | Kelly et al. .................. 455/67.4 |
| 2003/0054762 A1 | 3/2003 | Karabinis |
| 2003/0068978 A1 | 4/2003 | Karabinis et al. |
| 2003/0093187 A1* | 5/2003 | Walker ............................. 701/1 |
| 2003/0112831 A1* | 6/2003 | Williams ...................... 370/535 |
| 2003/0149986 A1 | 8/2003 | Mayfield et al. |
| 2003/0152169 A1* | 8/2003 | Chen ............................ 375/340 |
| 2003/0153308 A1 | 8/2003 | Karabinis |
| 2003/0199246 A1 | 10/2003 | Friedman et al. |
| 2003/0203717 A1* | 10/2003 | Chuprun et al. ............. 455/12.1 |
| 2004/0010368 A1* | 1/2004 | Scott ............................ 701/213 |
| 2004/0028411 A1* | 2/2004 | Londono ...................... 398/121 |
| 2004/0072539 A1 | 4/2004 | Monte et al. |
| 2004/0072562 A1* | 4/2004 | Heuvel et al. ................ 455/428 |
| 2004/0092228 A1* | 5/2004 | Force et al. .................... 455/19 |
| 2004/0095907 A1* | 5/2004 | Agee et al. ................... 370/334 |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis et al. |
| 2004/0192293 A1 | 9/2004 | Karabinis |
| 2004/0192395 A1 | 9/2004 | Karabinis |
| 2004/0196798 A1* | 10/2004 | Abousleman .................. 370/316 |
| 2004/0203393 A1 | 10/2004 | Chen |
| 2004/0218626 A1* | 11/2004 | Tyldesley et al. ............. 370/464 |
| 2004/0240525 A1 | 12/2004 | Karabinis et al. |
| 2004/0259497 A1* | 12/2004 | Dent ............................. 455/13.3 |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0053100 A1* | 3/2005 | Abousleman et al. ........ 370/536 |
| 2005/0064813 A1 | 3/2005 | Karabinis |
| 2005/0079816 A1 | 4/2005 | Singh et al. |
| 2005/0090256 A1 | 4/2005 | Dutta |
| 2005/0094591 A1* | 5/2005 | Kwon ........................... 370/321 |
| 2005/0096034 A1* | 5/2005 | Petermann ................. 455/422.1 |
| 2005/0118948 A1 | 6/2005 | Karabinis et al. |
| 2005/0136836 A1 | 6/2005 | Karabinis et al. |
| 2005/0154925 A1* | 7/2005 | Chitrapu et al. .............. 713/202 |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0187677 A1* | 8/2005 | Walker ............................ 701/16 |
| 2005/0201449 A1 | 9/2005 | Churan |
| 2005/0208890 A1 | 9/2005 | Karabinis |
| 2005/0221757 A1* | 10/2005 | Karabinis .................... 455/12.1 |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0259613 A1* | 11/2005 | Garudadri et al. ........... 370/328 |
| 2005/0259623 A1* | 11/2005 | Garudadri et al. ............ 370/335 |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0023803 A1* | 2/2006 | Perlman et al. ............... 375/267 |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0103535 A1* | 5/2006 | Pahlaven et al. ........... 340/572.1 |
| 2006/0105707 A1 | 5/2006 | Karabinis |
| 2006/0111041 A1 | 5/2006 | Karabinis |
| 2006/0111056 A1 | 5/2006 | Dutta |
| 2006/0126750 A1* | 6/2006 | Friedman ..................... 375/260 |
| 2006/0135058 A1 | 6/2006 | Karabinis |
| 2006/0135060 A1 | 6/2006 | Karabinis |
| 2006/0135070 A1 | 6/2006 | Karabinis |
| 2006/0142913 A1* | 6/2006 | Coffee et al. ................... 701/35 |
| 2006/0165120 A1 | 7/2006 | Karabinis |
| 2006/0187888 A1* | 8/2006 | Chen ............................ 370/335 |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246908 A1* | 11/2006 | Petermann .................... 455/444 |
| 2006/0246909 A1* | 11/2006 | Petermann .................... 455/444 |
| 2006/0246910 A1* | 11/2006 | Petermann .................... 455/444 |
| 2006/0246911 A1* | 11/2006 | Petermann .................... 455/444 |
| 2007/0025464 A1 | 2/2007 | Perlman ........................ 375/267 |
| 2007/0032191 A1* | 2/2007 | Marko ......................... 455/12.1 |
| 2007/0077882 A1* | 4/2007 | Patsiokas et al. ............. 455/3.04 |
| 2008/0080631 A1* | 4/2008 | Forenza et al. ............... 375/260 |
| 2008/0118004 A1* | 5/2008 | Forenza et al. ............... 375/299 |
| 2008/0130790 A1* | 6/2008 | Forenza et al. ............... 375/299 |
| 2008/0162358 A1* | 7/2008 | Patsiokas et al. ............... 705/57 |
| 2008/0268837 A1* | 10/2008 | Marko ......................... 455/428 |
| 2008/0299990 A1* | 12/2008 | Knoblach et al. ........... 455/456.1 |
| 2009/0103494 A1* | 4/2009 | Ma et al. ...................... 370/331 |
| 2010/0183050 A1* | 7/2010 | Gat et al. ...................... 375/138 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0808034 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1257068 A2 | 11/2002 |
| EP | 1257068 A3 | 2/2003 |
| GB | 2341293 | 9/1998 |
| GB | 2341293 A * | 3/2000 |
| WO | WO 01/54314 A1 | 7/2001 |

OTHER PUBLICATIONS

Ayyagari et al., "A Satellite-augmented cellular network concept", *Wireless Networks,* Vo. 4, 1998, pp. 189-198.

International Search Report and Written Opinion for International Application No. PCT/US2006/024277, mailed Nov. 6, 2006.

* cited by examiner

SYSTEMS AND METHODS OF WAVEFORM AND/OR INFORMATION SPLITTING FOR WIRELESS TRANSMISSION OF INFORMATION TO ONE OR MORE RADIOTERMINALS OVER A PLURALITY OF TRANSMISSION PATHS AND/OR SYSTEM ELEMENTS

RELATED APPLICATION

This application claims the benefit of and priority to U.S. Provisional Patent Application No. 60/692,758 entitled "Systems And Methods Of Waveform And/Or Information Splitting For Wireless Transmission Of Information To One Or More Radioterminals Over A Plurality Of Transmission Paths And/Or System Elements," filed Jun. 22, 2005, the disclosure of which is hereby incorporated herein by reference as if set forth in its entirety.

FIELD OF THE INVENTION

This invention relates to wireless communications systems and methods, and more particularly to satellite and terrestrial wireless communications systems and methods.

BACKGROUND

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall hybrid system may become more economically viable, as it may be able to serve more effectively and reliably a larger subscriber base.

One example of terrestrial reuse of satellite frequencies is described in U.S. Pat. No. 5,937,332 to co-inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some of the same satellite frequency band and using substantially the same air interface for both terrestrial and satellite communications may be cost effective and/or aesthetically appealing. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to co-inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by an ancillary terrestrial network and/or radioterminals communicating therewith, due to, for example, the potential production of out-of-band and/or out-of-channel emissions by a radioterminal that is transmitting over a satellite frequency band.

A problem that may arise with satellite communications is the availability of feeder link bandwidth and/or the availability of downlink bandwidth at a satellite. Thus, a radioterminal that is used for both terrestrial-based communications and satellite communications may suffer decreased performance when communicating with a space-based component of a cellular satellite communications system with terrestrial frequency reuse if sufficient bandwidth is not available to/from a satellite serving the radioterminal.

SUMMARY

Methods of transmitting an information signal in a satellite communications system according to some embodiments of the invention include splitting the information signal into a first signal component and a second signal component, transmitting the first signal component to a first system element of the satellite communications system, transmitting the second signal component to a second system element of the satellite communications system, combining the first signal component and the second signal component to form a combined signal, and recovering the information signal from the combined signal.

The methods may further include transmitting the first signal component from the first system element to a destination terminal, and transmitting the second signal component from the second system element to the destination terminal. Combining the first signal component and the second signal component may be performed at the destination terminal.

The methods may further include transmitting the first signal component from the first system element to the second system element. Combining the first signal component and the second signal component may be performed at the second system element. The recovered information signal may be transmitted from the second system element to the destination terminal. The first system element may include a first satellite, the second system element may include a second satellite, and the destination terminal may include a radioterminal and/or a satellite gateway.

The methods may further include forming an analog waveform representative of the information signal, and splitting the information signal may include splitting the analog waveform into a first waveform and a second waveform. Transmitting the first signal component may include transmitting the first waveform, and transmitting the second signal component may include transmitting the second waveform.

Splitting the analog waveform may include filtering the analog waveform, and transmitting the first waveform may include modulating a first carrier signal with the first waveform and transmitting the modulated carrier signal to the first system component. Transmitting the second waveform may include modulating a second carrier signal with the second waveform and transmitting the modulated carrier signal to the second system component.

The methods may further include transmitting the first signal component from the first system element to the second system element.

A bandwidth of the recovered information signal may exceed a bandwidth capability of one of the first system element or the second system element.

The information signal may include a digital information signal, and splitting the information signal may include splitting the digital information signal into a first digital information stream and a second digital information stream. Transmitting the first signal component may include transmitting the first digital information stream to the first system element, and transmitting the second signal component may include transmitting the second digital information stream to the second system element.

The methods may further include interleaving and/or encoding the digital information signal prior to splitting the digital information signal into the first digital information stream and the second digital information stream.

The methods may further include transmitting the first digital information stream from the first system element and transmitting the second digital information stream from the second system element. Transmitting the first digital information stream from the first system element may include applying a first orthogonal spreading code to the first digital information stream, and transmitting the second digital information stream from the second system element may include applying a second orthogonal spreading code to the second digital information stream.

Transmitting the first signal component from the first system element to the destination terminal may include transmitting a portion of the first signal component to the destination terminal using a first carrier frequency, and transmitting the second signal component from the second system element to the destination terminal may include transmitting a portion of the second signal component to the destination terminal using a second carrier frequency after the portion of the first signal component has been received. The first carrier frequency and the second carrier frequency may be the same frequency.

In some embodiments, the first carrier frequency and the second carrier frequency may include different frequencies, and transmitting the first signal component from the first system element may include transmitting in a first time slot of a first TDMA channel and transmitting the second signal component from the second system element may include transmitting in a second time slot of a second TDMA channel.

The first carrier frequency and the second carrier frequency may include different carrier frequencies, and transmitting the portion of the first signal component may include transmitting in a first time slot and transmitting the portion of the second signal component may include transmitting in a second time slot that may be spaced apart in time from the first time slot.

The methods may further include tuning a receiver of the destination terminal to the first carrier frequency, receiving the portion of the first signal component from the first system element, tuning the receiver of the destination terminal to the second carrier frequency, and receiving the portion of the second signal component from the second system element.

Receiving the first signal component may include tuning a receiver of the destination terminal to the first carrier frequency and receiving data transmitted in the first time slot, and tuning the receiver to the second carrier frequency and receiving data transmitted in the second time slot.

Receiving data transmitted in the first time slot may include receiving data transmitted in the first time slot of a first frame transmitted on the first carrier frequency, and receiving data transmitted in the second time slot may include receiving data transmitted in the second time slot of a first frame transmitted on the second carrier frequency. The methods may further include, after receiving data transmitted in the second time slot of the first frame on the second carrier frequency, tuning the receiver to the first carrier frequency and receiving data transmitted in the first time slot of a second frame transmitted on the first carrier frequency.

A communications system according to some embodiments of the invention includes a waveform generator configured to generate an analog waveform representative of an information signal, and a waveform splitter configured to split the analog waveform into a first signal component and a second signal component, configured to transmit the first signal component to a first system element of the communications system, and configured to transmit the second signal component to a second system element of the communications system.

The first system element may include a first satellite and the second system element may include a second satellite. The first satellite may be configured to transmit the first signal component, and the second satellite may be configured to transmit the second signal component.

The communications system may further include a radioterminal configured to receive the first signal component and the second signal component and configured to combine the first signal component and the second signal component to form a combined signal. The radioterminal may be further configured to recover the information signal from the combined signal.

The second satellite may be configured to receive the first signal component from the first satellite, and the second satellite may be further configured to combine the first signal component and the second signal component to form a combined signal and to transmit the combined signal.

The first satellite may be configured to transmit the first signal component to the second satellite, and the second satellite may be configured to combine the first signal component and the second signal component, configured to recover the information signal from the combined first signal component and second signal component, and configured to transmit the recovered information signal.

The communications system may further include a radioterminal configured to receive the first signal component and the second signal component and configured to recover the information signal from the first signal component and the second signal component.

The radioterminal may be configured to combine the first signal component and the second signal component and to recover the information signal from the combined first signal component and second signal component.

The waveform splitter may be configured to filter the analog waveform to obtain a first waveform component and a second waveform component, and the waveform splitter may be further configured to modulate a first carrier signal with the first waveform component and transmit the modulated carrier signal to the first system component, and the waveform splitter may be configured to modulate a second carrier signal with the second waveform component and transmit the modulated carrier signal to the second system component.

A communications system according to further embodiments of the invention includes an information splitter configured to split an information signal into a first information signal component and a second information signal component, a first transmitter configured to transmit the first information signal component to a first system element of the communications system, and a second transmitter configured to transmit the second information signal component to a second system element of the communications system.

The communications system may further include a first waveform generator configured to generate a first analog waveform representative of the first information signal component, and a second waveform generator configured to generate a second analog waveform representative of the second information signal component. The first transmitter may be configured to transmit the first analog waveform and the second transmitter may be configured to transmit the second analog waveform.

The first system element may include a first satellite and the second system element may include a second satellite. The first satellite may be configured to receive the first information signal component and to transmit the first information signal component, and the second satellite may be configured to receive the second information signal component and to transmit the second information signal component.

The first satellite may be configured to transmit the first information signal component to the second satellite, and the second satellite may be configured to combine the first information signal component and the second information signal component, configured to recover the information signal from the combined first information signal component and second information signal component, and configured to transmit the recovered information signal.

The communications system may further include a radioterminal configured to receive the first information signal component and the second information signal component and configured to recover the information signal from the first signal component and the second signal component.

The radioterminal may be configured to combine the first information signal component and the second information signal component and to recover the information signal from the combined first signal component and second signal component.

The first satellite may be configured to transmit the first information signal component in a transmission channel, and the second satellite may be configured to transmit the second information signal in the same transmission channel after the transmission of the first information signal component has finished.

The first satellite may be configured to transmit the first information signal component in a first time slot in a first transmission channel, and the second satellite may be configured to transmit the second information signal component in a second time slot in a second transmission channel.

The first time slot of the first transmission channel and the second time slot of the second transmission channel may be separated by a sufficient time interval to permit a receiver to tune between a frequency of the first transmission channel and a frequency of the second transmission channel.

The first satellite may be configured to spread the first information signal component using a first orthogonal spreading code and the second satellite may be configured to spread the second information signal component using a second orthogonal spreading code.

The communications system may further include a radioterminal including a receiver including a first correlator configured to detect an information signal component spread using the first orthogonal spreading code and a second correlator configured to detect an information signal component spread using the second orthogonal spreading code.

The receiver of the radioterminal may further include a first slicer configured to generate an estimate of the first information signal component from an output of the first correlator, a second slicer configured to generate an estimate of the second information signal component from an output of the second correlator, and an information combiner configured to combine the estimate of the first information signal component with the estimate of the second information signal component to recover the information signal.

Some embodiments of the invention provide a satellite of a satellite communications system including an antenna configured to receive a first information signal component from a satellite gateway and a second information signal from a second satellite, and a control unit configured to combine the first information signal component and the second information signal component, configured to recover an information signal from the combined first information signal component and second information signal component, and configured to transmit the recovered information signal.

The control unit may be further configured to decode and/or de-interleave the first information signal component and/or the second information signal component.

The control unit may be further configured to recover the information signal from the decoded and/or de-interleaved first information signal and/or the decoded and/or de-interleaved second information signal.

Some embodiments of the invention provide a satellite gateway of a satellite communications system, the satellite gateway including a waveform generator configured to generate an analog waveform representative of an information signal, and a waveform splitter configured to split the analog waveform into a first signal component and a second signal component, configured to transmit the first signal component to a first system element of the communications system, and configured to transmit the second signal component to a second system element of the communications system.

The waveform splitter may be configured to filter the analog waveform to obtain a first waveform component and a second waveform component, and the waveform splitter may be further configured to modulate a first carrier signal with the first waveform component and transmit the modulated carrier signal to the first system component. The waveform splitter may be further configured to modulate a second carrier signal with the second waveform component and transmit the modulated carrier signal to the second system component.

A satellite gateway of a satellite communications system according to further embodiments of the invention includes an information splitter configured to split an information signal into a first information signal component and a second information signal component, a first transmitter configured to transmit the first information signal component to a first system element of the communications system, and a second transmitter configured to transmit the second information signal component to a second system element of the communications system.

The satellite gateway may further include a first waveform generator configured to generate a first analog waveform representative of the first information signal component, and a second waveform generator configured to generate a second analog waveform representative of the second information signal component. The first transmitter may be configured to transmit the first analog waveform and the second transmitter may be configured to transmit the second analog waveform.

A radioterminal according to some embodiments of the invention includes a housing, an antenna supported by the housing, and a communications module coupled to the antenna and configured to receive a first signal component and a second signal component, configured to combine the first signal component and the second signal component to form a combined signal, and configured to recover an information signal from the combined signal.

The communications module may further include a first correlator configured to detect an information signal component spread using a first orthogonal spreading code and a second correlator configured to detect an information signal component spread using a second orthogonal spreading code.

The communications module may further include a first slicer configured to generate an estimate of the first information signal component from an output of the first correlator, a second slicer configured to generate an estimate of the second information signal component from an output of the second correlator, and an information combiner configured to combine the estimate of the first information signal component with the estimate of the second information signal component to recover the information signal.

The communications module may be configured to receive a portion of the first signal component, configured to tune a receiver of the communication module to a second carrier frequency, and configured to receive a portion of the second signal component.

The communications module may be further configured to receive the first signal component in a first timeslot using a time division multiple access protocol and to receive the second signal component in a second timeslot using the time division multiple access protocol.

The communications module may be further configured to tune a receiver of the communications module to a first carrier frequency and receive data transmitted in the first time slot, and configured to tune the receiver to a second carrier frequency and receive data transmitted in the second time slot.

The radioterminal may further include a waveform generator configured to generate an analog waveform representative of an information signal, and a waveform splitter configured to split the analog waveform into a first signal component and a second signal component, configured to transmit the first signal component to a first system element of the communications system, and configured to transmit the second signal component to a second system element of the communications system.

The waveform splitter may be configured to filter the analog waveform to obtain a first waveform component and a second waveform component, and the waveform splitter may be further configured to modulate a first carrier signal with the first waveform component and transmit the modulated carrier signal to the first system component, and the waveform splitter may be configured to modulate a second carrier signal with the second waveform component and transmit the modulated carrier signal to the second system component.

The radioterminal may further include an information splitter configured to split an information signal into a first information signal component and a second information signal component, a first transmitter configured to transmit the first information signal component to a first system element of the communications system, and a second transmitter configured to transmit the second information signal component to a second system element of the communications system.

The radioterminal may further include a first waveform generator configured to generate a first analog waveform representative of the first information signal component, and a second waveform generator configured to generate a second analog waveform representative of the second information signal component, the first transmitter may be configured to transmit the first analog waveform and the second transmitter may be configured to transmit the second analog waveform.

A satellite gateway of a satellite communications system according to some embodiments of the invention includes an antenna and a communications module coupled to the antenna and configured to receive a first signal component and a second signal component and configured to combine the first signal component and the second signal component to form a combined signal, and configured to recover an information signal from the combined signal.

The communications module may further include a first correlator configured to detect an information signal component spread using a first orthogonal spreading code and a second correlator configured to detect an information signal component spread using a second orthogonal spreading code.

The communications module may further include a first slicer configured to generate an estimate of the first information signal component from an output of the first correlator, a second slicer configured to generate an estimate of the second information signal component from an output of the second correlator, and an information combiner configured to combine the estimate of the first information signal component with the estimate of the second information signal component to recover the information signal.

The communications module may be configured to receive a portion of the first signal component, configured to tune a receiver of the communication module to a second carrier frequency, and configured to receive a portion of the second signal component.

The communications module may be further configured to receive the first signal component in a first timeslot using a time division multiple access protocol and configured to receive the second signal component in a second timeslot using the time division multiple access protocol.

The communications module may be further configured to tune a receiver of the communications module to a first carrier frequency and receive data transmitted in the first time slot, and configured to tune the receiver to a second carrier frequency and receive data transmitted in the second time slot.

The communications module may include a receiver configured to receive a first and second waveforms, a waveform combiner configured to combine the first waveform and the second waveform to form a combined signal, and a detector configured to recover an information signal from the combined signal.

A satellite gateway according to some embodiments of the invention includes a receiver configured to receive a first signal and a second signal, a detector configured to detect a first information stream from the first signal and a second information stream from the second signal, and a combiner configured to combine the first information stream and the second information stream to form a combined information stream.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
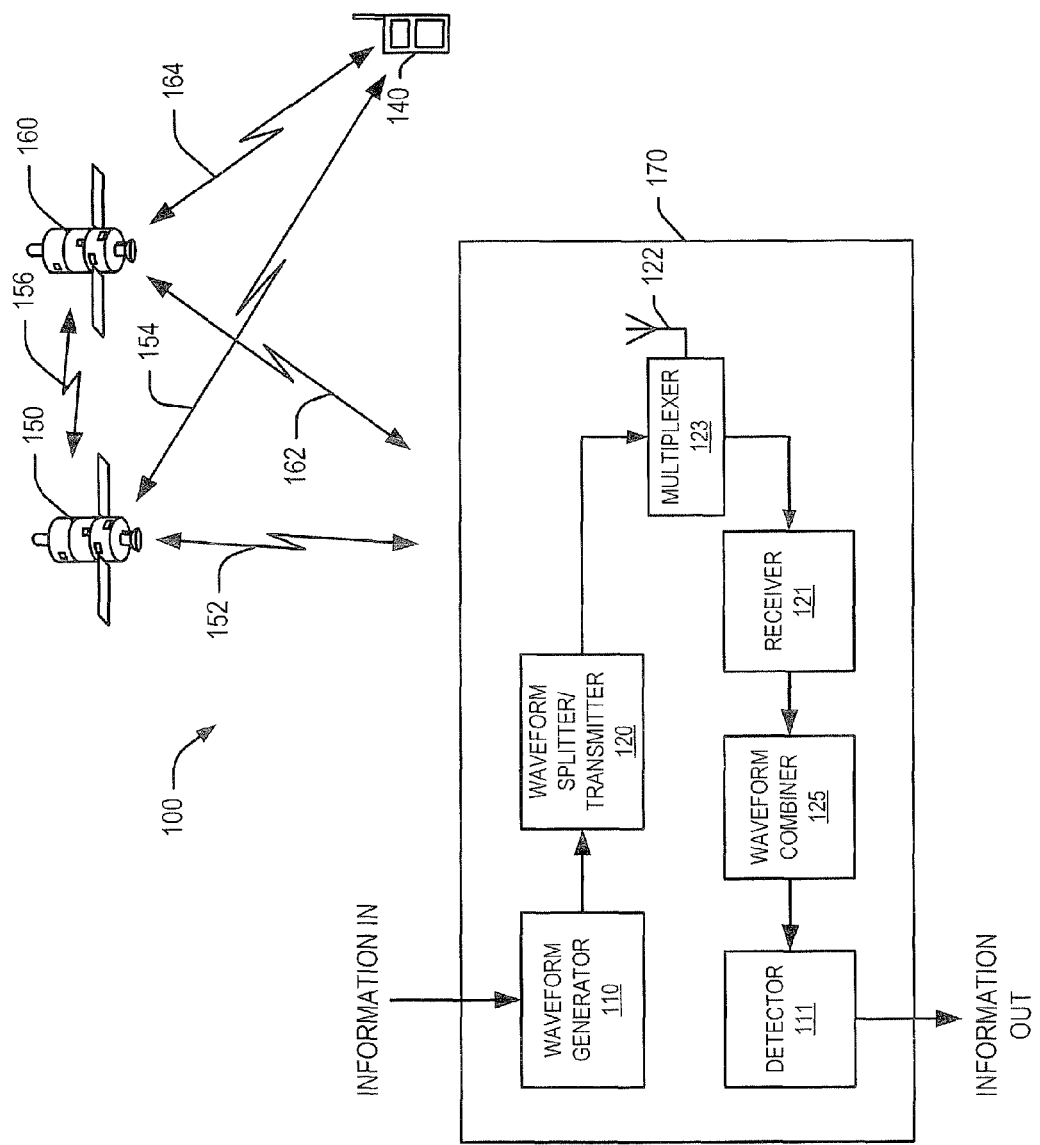
FIGS. 1-4 are schematic diagrams of satellite communications systems and methods according to embodiments of the invention.

Specific exemplary embodiments of the invention now will be described with reference to the accompanying drawing.

This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first satellite below could be termed a second satellite, and similarly, a second satellite may be termed a first satellite without departing from the teachings of the present invention. As used herein, the term "and/or" includes any and all combinations of one or more of the associated listed items. The symbol "/" is also used as a shorthand notation for "and/or".

Conventional wireless communications systems and methods may include a plurality of system elements each of which may be configured and/or authorized to radiate/transmit a specific set of frequencies. It may be desirable for the wireless communications system/method to communicate information to one or more radioterminals using a specific system element and a communications waveform including an aggregate bandwidth that exceeds a capability of the specific system element due to the aggregate bandwidth of the communications waveform exceeding a limit and/or due to the specific system element utilizing a portion of its configuration capability and/or authorized set of frequencies to radiate/transmit one or more other waveforms. For example, it may be desirable for the wireless communications system/method to communicate information to a radioterminal having a first bandwidth that exceeds an available amount of feeder link and/or downlink spectrum available to a satellite serving the radioterminal.

In some embodiments of the invention, the communications waveform may be decomposed by a waveform splitter into a plurality of waveform components (i.e. at least two waveform components) wherein an aggregate bandwidth of a first waveform component is less than the aggregate bandwidth of the communications waveform and can be accommodated by the specific system element. Accordingly, in some embodiments of the invention, the first waveform component is routed to a first system element and is radiated/transmitted by the first system element, and a number of remaining waveform components (at least one) are/is routed to other system elements and are/is radiated/transmitted by the other system elements to thereby accomplish a substantially complete wireless transmission of the communications waveform including the aggregate bandwidth that cannot be accommodated by the specific system element.

It will be understood that the plurality of waveform components that are radiated/transmitted by a corresponding plurality of system elements may be received and processed by a device such as, for example, a radioterminal to substantially form/recreate a measure of the communications waveform that has been decomposed by the waveform splitter into the plurality of waveform components. In some embodiments, no substantial information may be lost by the decomposition of the communications waveform by the waveform splitter into the plurality of waveform components.

In other embodiments of the invention, the information that is to be communicated may be decomposed into a plurality of information components (i.e. at least two information components), a respective one of which is routed to and transmitted from a first system element and at least one other system element, wherein the aggregate bandwidth of the waveform that includes a first information component can be accommodated by the specific system element, to thereby accomplish a substantially complete wireless transmission of the information including the aggregate bandwidth that cannot be accommodated by the specific system element. Thus, the information itself and/or the aggregate communications waveform corresponding thereto may be decomposed and provided to multiple system elements, to accommodate the bandwidth availability of the multiple system elements, and can be transmitted by the multiple system elements to a given radioterminal (or to several radioterminals), where the multiple waveforms are then combined to form/recreate a measure of the information that was provided.

In some embodiments, the information and/or the aggregate communications waveform corresponding thereto may be decomposed into first and second components and provided to first and second system elements, respectively. The first system element may transmit the first component to the second system element, which may combine the components to form/recreate a measure of the information that was provided. The recovered information may then be transmitted from the second system element to a destination radiotelephone.

FIG. 1 illustrates embodiments of waveform splitting for wireless transmission of information to one or more radioterminals over a plurality of transmission paths and/or system elements, according to exemplary embodiments of the invention, wherein the system elements include satellites. As illustrated in FIG. 1, a satellite gateway 170 includes a waveform generator 110 and a waveform splitter 120. Information received by the gateway 170 is processed by the waveform generator 110 to form a communications waveform. The waveform generator 110 may, for example, perform the functions of Forward Error Correction (FEC) encoding, interleaving, frame formatting, modulation, amplification, filtering, discrete-time to continuous-time conversion (which may, in some embodiments, be performed by, for example, a Digital-to-Analog (D/A) converter) and/or other signal processing functions (not necessarily in the order stated).

The communications waveform, at the output of the waveform generator, may have an aggregate bandwidth of B Hz, may be provided to an input of the waveform splitter 120, as illustrated in FIG. 1. The waveform splitter 120 may be configured to decompose the communications waveform into at least a first waveform component (waveform component 1) and a second waveform component (waveform component 2) wherein at least the first waveform component has an aggregate bandwidth less than B Hz. In some embodiments of the invention, the waveform splitter may perform the functions of continuous-time to discrete-time conversion (which may, in some embodiments, be performed by, for example, a Sample-and-Hold (S/H) circuit and/or an Analog-to-Digital (A/D) converter), time-domain to frequency-domain conversion (which may, in some embodiments, be performed by a Fourier transform such as, for example, a Fast Fourier Transform (FFT)), frequency translation, demodulation, modulation, filtering, amplification, frequency-domain to time-domain conversion (which, in some embodiments, may be performed by an inverse Fourier transform such as, for example, an Inverse Fast Fourier Transform (IFFT)), discrete-time to continuous-time conversion (which may, in some embodiments, be performed by, for example, a Digital-to-Analog (D/A) converter) and/or other signal processing functions (not necessarily in the order stated).

Figure 5:
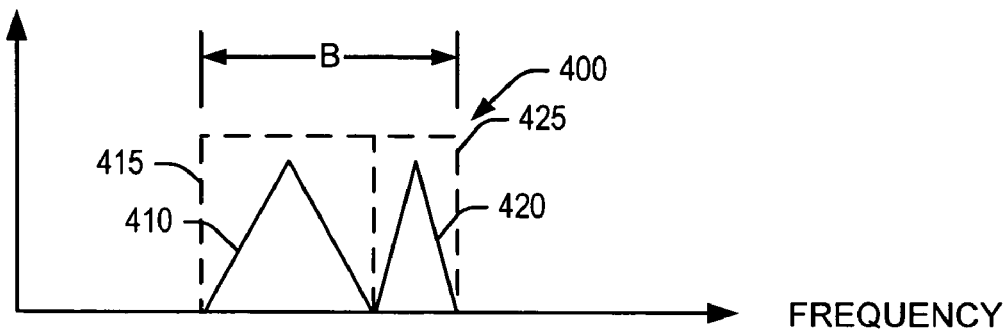
FIG. 5 is a graph illustrating an information signal including two frequency components.

The waveform splitter may split the communications waveform into first and second waveform components using, for example, a pair of bandpass filters. For example, referring to FIG. 5, an information signal 400 may include a low frequency signal component 410 and a high frequency signal component 420. The information signal may be split into its constituent components using a first bandpass filter 415 and a second bandpass filter 425 (shown schematically as windows in the graph of FIG. 5). The low frequency signal component 410 and the high frequency signal component 420 may be transmitted to the destination radioterminal using separate system elements and combined at the destination radioterminal to recover the information signal 400.

Referring again to FIG. 1, the first waveform component is transmitted by the waveform splitter 120 through a multiplexer 123 and antenna 122 to a first satellite 150 over a first satellite feeder link 152. The second waveform component may be transmitted simultaneously by the waveform splitter 120 to a second satellite 160 via a second satellite feeder link 162. In some embodiments, two separate antennas 122, which may be configured physically proximate to, or physically distant from, each other, may be used by the waveform splitter 120 to transmit the first waveform component and the second waveform component to the respective satellites 150, 160 over the respective feeder links 152, 162, as illustrated in FIG. 1. In other embodiments, the waveform splitter 120 may use a single antenna configuration to transmit the first waveform component and the second waveform component to the respective satellites 150, 160 over the respective feeder links 152, 162. In some embodiments, two separate transmitters may be used to transmit waveforms including the information components (streams) to the respective satellites. In still other embodiments, a single transmitter and/or shared transmitter components may be used to transmit waveforms including the information components (streams) to the respective satellites. The first and second waveform components may be transmitted using the same or different frequencies, polarizations, coding/modulation schemes, spreading codes, and/or beam-forming patterns.

The first and second satellites 150, 160 may be configured to receive the first and second waveform components, respectively, as illustrated in FIG. 1, and, following further processing which may perform at least one of amplification, filtering and frequency translation (not necessarily in that order), transmit the first waveform component and the second waveform component over respective forward service links 154, 164, as illustrated in FIG. 1, to one or more radioterminals 140. The first and second satellites 150, 160 may transmit the first waveform component and the second waveform component, respectively simultaneously or sequentially. The radioterminal 140 may be configured to receive the first waveform component and the second waveform component over the forward service links 154, 164 and to combine the first waveform component and the second waveform component to form a combined waveform having an aggregate bandwidth that may be larger than the bandwidth of either the first waveform component or the second waveform component. The radioterminal 140 may then recover the information signal from the combined waveform.

In some embodiments of the invention, the first satellite 150 and the second satellite 160 may be configured to transmit the first and second waveform components over respective forward service link frequency sets that are substantially contiguous, to thereby provide at the radioterminal 140 a substantially frequency-domain ordered/aligned and/or continuous communications waveform having the aggregate bandwidth. In other embodiments, the first satellite 150 and the second satellite 160 may be configured to transmit the first and second waveform components over respective forward service link frequency sets that are not substantially contiguous, to thereby provide at the radioterminal 140 a substantially frequency-domain unordered/misaligned and/or discontinuous communications waveform including the aggregate bandwidth, and the radioterminal 140 may be configured to perform frequency-domain ordering/alignment and/or re-arranging of the received waveform components, by frequency translating at least one of the first waveform component and the second waveform component, to thereby form a substantially frequency-domain ordered/aligned and/or continuous communications waveform including the aggregate bandwidth.

In some embodiments, the first waveform component and the second waveform component may be transmitted by the first and second satellites 150, 160, respectively, so as to provide at the radioterminal a substantially time-domain aligned communications waveform. However, in other embodiments, the first and second waveform components may not be received at the radioterminal 140 in a time-domain aligned manner, and the radioterminal 140 may be configured to perform time-domain ordering/alignment and/or rearranging of the received waveform components by time shifting at least one, to thereby form a substantially time-domain ordered/aligned and/or continuous communications waveform having the aggregate bandwidth.

On the return service link (i.e. from the radioterminal 140 to the first and second satellites 150, 160), the radioterminal may transmit a single signal to one of the first and second satellites 150, 160. In some embodiments of the invention, however, the radioterminal 140 may include a waveform splitter, such as the waveform splitter 120 of the satellite gateway 170, and the radioterminal 140 may split a waveform to be transmitted into first and second waveform components. The radioterminal 140 may transmit the first and second waveform components over satellite links 154, 164, to the first and second satellites 150, 160, respectively. The first and second satellites 150, 160 may transmit the first and second waveform components to the satellite gateway 170, which may receive the first and second waveform components using a receiver 121 and combine the first and second waveform components using a waveform combiner 125 to form a combined waveform. A detector 111 in the satellite gateway 170 detects the transmitted information signal from the combined waveform. Alternatively, the second satellite 160 may transmit the second waveform component to the first satellite 150 via an inter-satellite link 156. The first satellite 150 may combine the first and second waveform components to form a combined waveform, and may transmit the combined waveform to the satellite gateway 170.

Figure 2:
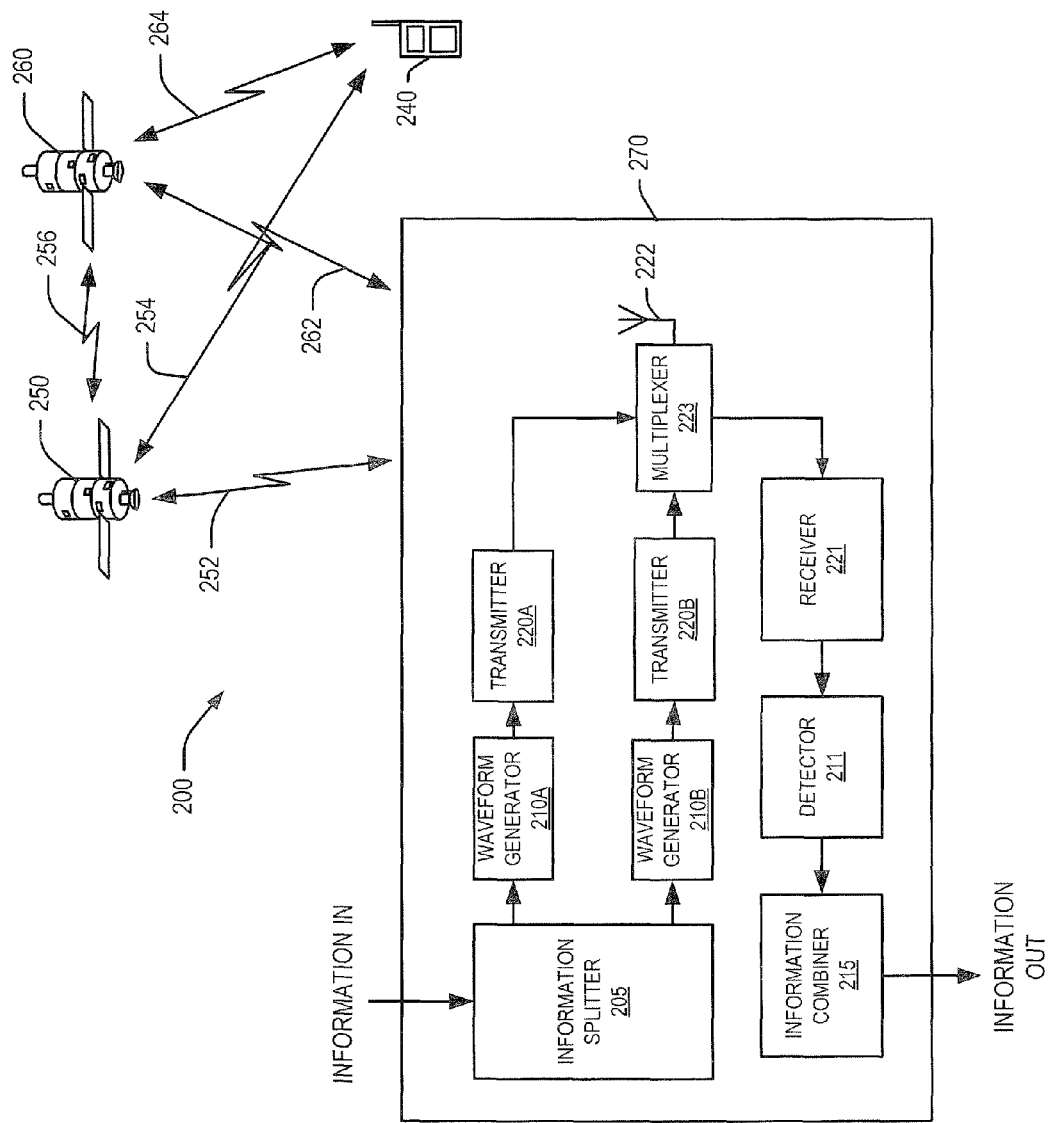

Other embodiments of the present invention are illustrated in FIG. 2, in which the information itself may be split into two or more components (information streams) by an information splitter 205 in a satellite gateway 270. The information splitter 205 may encode and/or interleave the information streams before or after splitting the information. The information streams may be provided to respective waveform generators 210A, 210B in the satellite gateway 270, which generate waveforms in response to the information. A first waveform generated by the waveform generator 210A may be transmitted to a first satellite 250 by a first transmitter 220A in the satellite gateway 270 through a multiplexer 223 and antenna 222 via a feeder link 252, and a second waveform generated by the waveform generator 210B may be transmitted to a second satellite 260 by a second transmitter 220B in the satellite gateway 270 via a second feeder link 262. The frequencies, protocols and/or modulation schemes used for the first feeder link 252 may be the same as or different from those used for the second feeder link 262. It will be appreciated that the data rate (bits per second) of information transmitted via the first feeder link 252 and the second feeder link 262 may be less than the data rate of information provided to the information splitter 205. The information splitter may split the information into first and second information streams to be transmitted over the first and second feeder links 252, 262, based on a determination of available bandwidth on each of the feeder links 252, 262. Accordingly, some embodiments of the invention may be particularly applicable when insufficient feeder link bandwidth is available at a single satellite to provide a desired communications rate to a radioterminal. In that case, the information (or a waveform that is representative of the information) may be split and sent via a plurality of satellites.

The first information stream may be transmitted to a radioterminal 240 by the first satellite 250 via a first satellite downlink 254, and the second information stream may be transmitted by the second satellite 260 via a second satellite downlink 264. The radioterminal 240 is configured to receive the first information stream and the second information stream and to combine the first and second information stream to generate a measure of the original information stream.

On the return service link (i.e. from the radioterminal 240 to the first and second satellites 250, 260), the radioterminal may transmit a single signal to one of the first and second satellites 250, 260. In some embodiments of the invention, however, the radioterminal 240 may include an information splitter and respective waveform generators and transmitters, such as the information splitter 205, the waveform generators 210A, 210B, and the transmitters 220A, 220B of the satellite gateway 270, and the radioterminal 240 may split an information stream to be transmitted into first and second information streams. The radioterminal 240 may transmit the first and second information streams over satellite links 254, 264, to the first and second satellites 250, 260, respectively. The first and second satellites 250, 260 may transmit the first and second information streams to the satellite gateway 270, which may receive the information streams using a receiver 221 and detect the information in the received information streams using a detector 211. The detected information streams may be combined using an information combiner 215 to form a combined information stream. Alternatively, the second satellite 260 may transmit the second information stream to the first satellite 250 via an inter-satellite link 256. The first satellite 250 may combine the first and second information streams to form a combined information stream, and may transmit the combined information stream to the satellite gateway 270.

Figure 3:
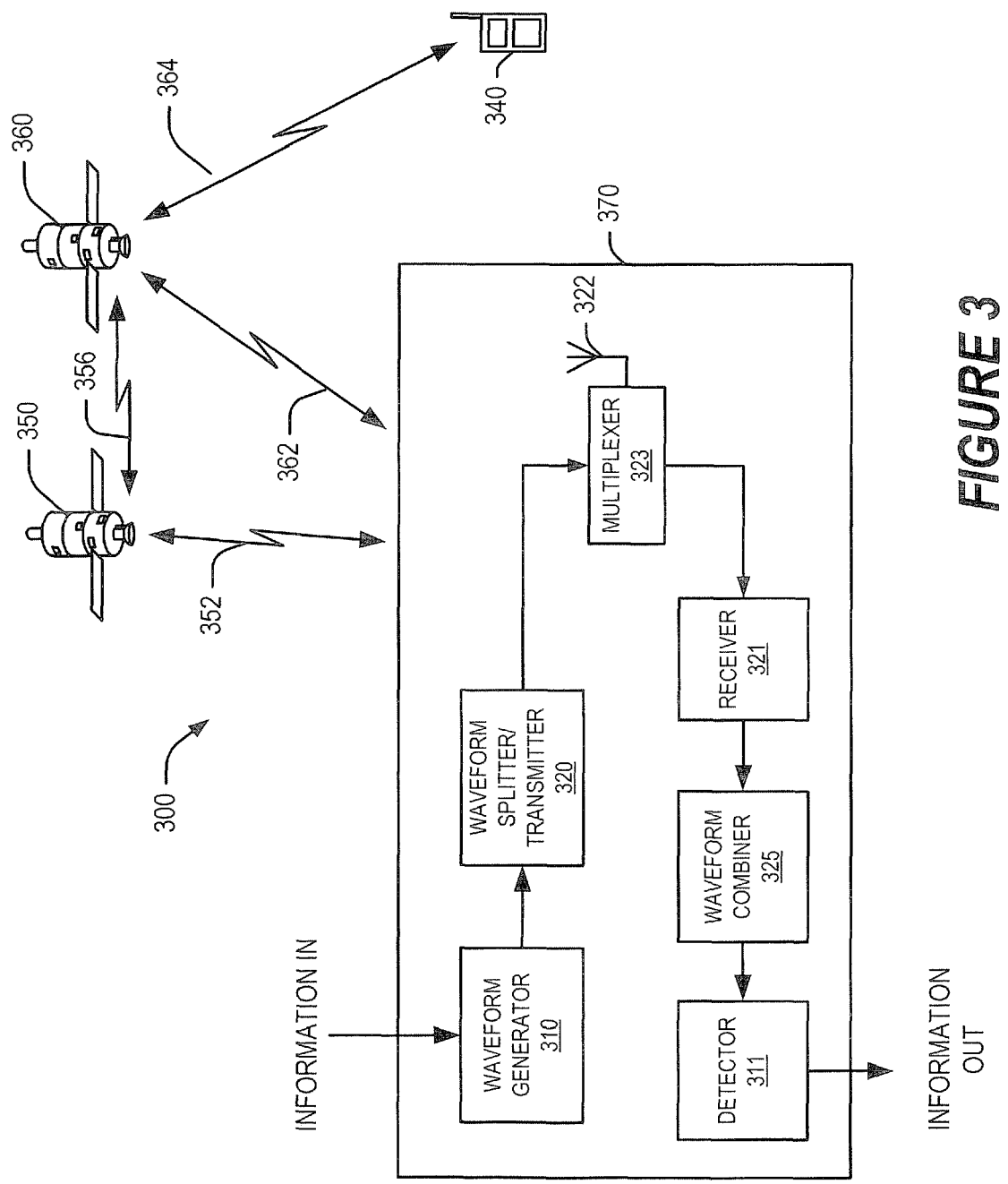

Further embodiments of the invention are illustrated in FIG. 3, in which information is provided to a waveform generator 310 in a satellite gateway 370, which generates a waveform indicative of the information. The waveform is split into first and second waveform components by a waveform splitter 320 in the satellite gateway 370, and transmitted via respective feeder links 352 and 362 to first and second satellites 350 and 360. The first waveform component is then transmitted via an inter-satellite link 356 from the first satellite 350 to the second satellite 360. The second satellite 360 may then combine the first and second waveform components to recover the original waveform generated by the waveform generator 310, and transmit the recovered waveform to a destination radioterminal 340. Accordingly, in the embodiments illustrated in FIG. 3, no modifications of the radioterminal 340 may be required in order to permit the radioterminal 340 to receive two separate waveform components. Furthermore, since recombination of the first and second waveform components may be performed at the second satellite 360, processing of the first and second waveform components may be more easily configured/reconfigured by a system operator. Moreover, reconstruction of the original waveform may be simplified, as it may be easier to synchronize the operation of the first and second satellites.

As in the satellite gateway 170 of FIG. 1, the satellite gateway 370 of FIG. 3 may also include a receiver 321 coupled to an antenna 322 through a multiplexer 323, a waveform combiner 325 and a detector 311, that are configured to combine a plurality of waveforms received from the first and second satellites 350, 360 to detect an information signal therefrom.

Figure 4:
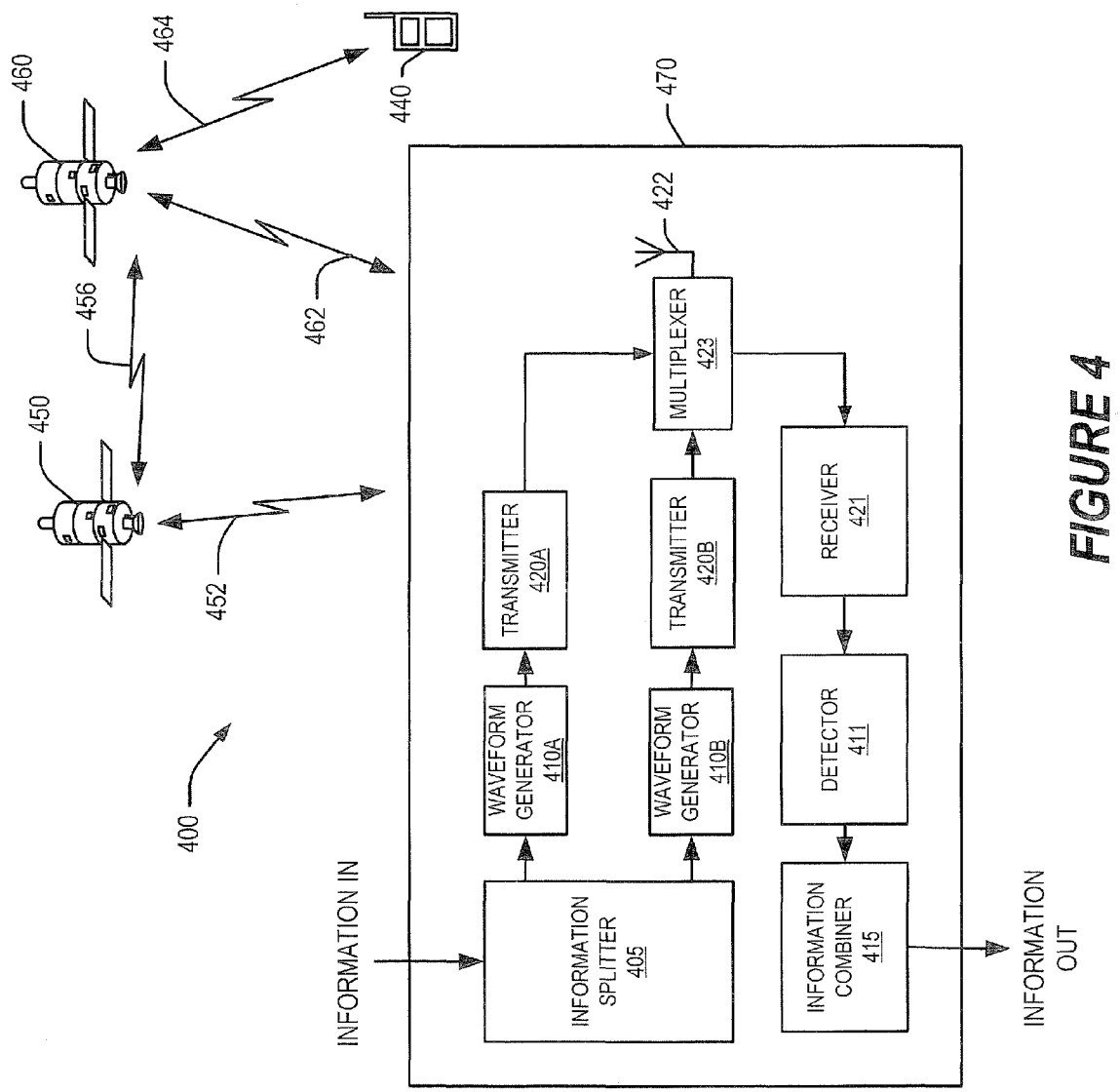

Similarly, FIG. 4 illustrates embodiments in which an information signal is split by an information splitter 405 in a satellite gateway 470 into first and second information streams, which are respectively provided to first and second waveform generators 410A, 410B and transmitters 420A, 420B in the satellite gateway 470, which transmit the first and second information streams via respective first and second satellite feeder links 452, 462 to first and second satellites 450, 460. The first satellite 450 may detect the information in the first information stream and retransmit the information stream via an inter-satellite link 456 from the first satellite 450 to the second satellite 460. The information stream may be transmitted using a same or different modulation/encoding scheme than the modulation/encoding scheme used to transmit the information stream to the first satellite 450. The second satellite 460 detects the information in the first and second information streams and combines the first and second information streams to form/recover the original information stream. The first and second information streams may be decoded and/or de-interleaved at the second satellite 460 to recover the original information stream. The recovered information stream is then transmitted by the second satellite to a destination radioterminal 440.

As in the satellite gateway 270 of FIG. 2, the satellite gateway 470 of FIG. 4 may also include a receiver 421 coupled to an antenna 422 through a multiplexer 423, a detector 411 and an information combiner 415 configured to combine a detect a plurality of information streams received from the first and second satellites 450, 460 and to combine the detected information streams to form a combined information stream, respectively.

Figure 6:
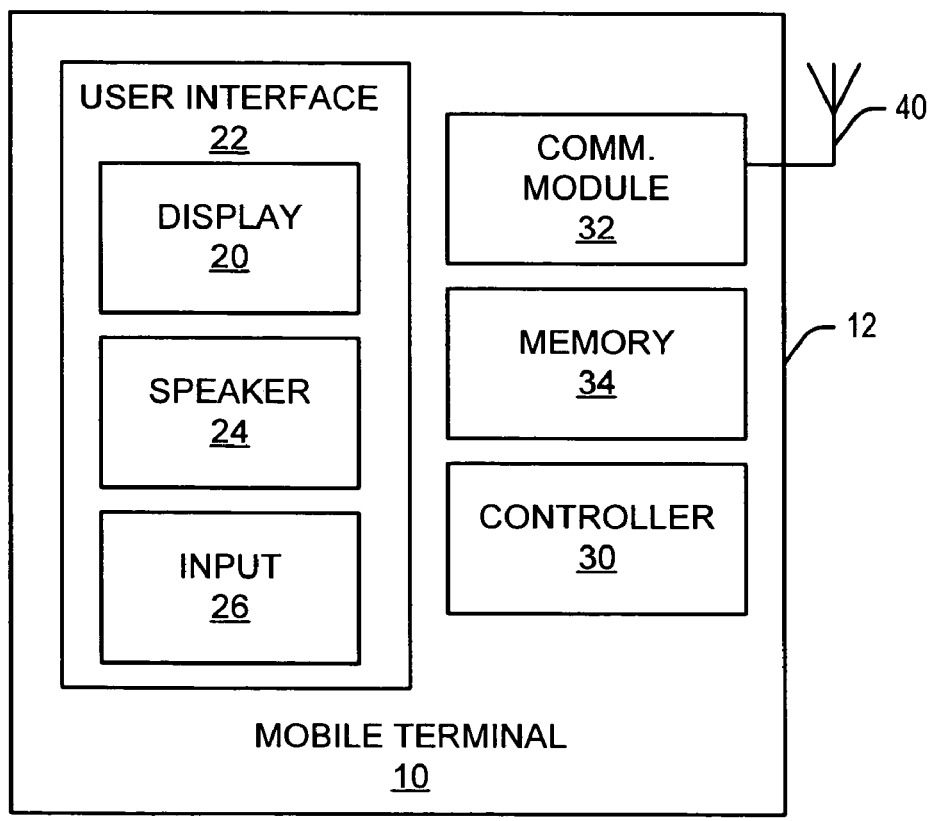
FIG. 6 is a block diagram of a radiotelephone according to embodiments of the invention.

Referring now to FIG. 6, an exemplary radioterminal in accordance with some embodiments of the present invention is illustrated. The radioterminal 10 is configured to communicate data with one or more other wireless terminals over a wireless communication interface therebetween.

The radioterminal 10 in the illustrated embodiments includes a portable housing assembly 12, a controller 30, a communication module 32, and a memory 34. The radioterminal 10 further includes a user interface 22 (i.e., a man machine interface) including a display 20, a speaker 24 (i.e., a sound transducer), and at least one input device 26. The foregoing components of the radioterminal 10 may be included in many conventional mobile terminals and their functionality is generally known to those skilled in the art.

The display 20 may be any suitable display screen assembly. For example, the display 20 may be a liquid crystal display (LCD) with or without auxiliary lighting (e.g., a lighting panel).

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio data stream responsive to sound incident on the microphone.

The controller 30 may support various functions of the radioterminal 10. The controller 30 can be any commercially available or custom microprocessor, for example. The memory 34 is configured to store digital information signals and data.

The communication module 32 is configured to communicate data over one or more wireless interfaces to another remote wireless terminal, such as a satellite, as discussed herein. Accordingly, the communication module 32 can include a satellite communication module configured to send/receive signals in a satellite communication frequency via an antenna 40. The communication module may be configured to receive digital information transmitted via a frequency division multiple access (FDMA) protocol, a time division multiple access (TDMA) protocol, a code division multiple access (CDMA) protocol, and/or an orthogonal frequency division multiple access (OFDMA) protocol. The communication module may be configured to transmit/receive signals using one or more communications protocols simultaneously and/or non-simultaneously.

The communication module 32 can include a transceiver typically having a transmitter circuit and a receiver circuit, which respectively transmit outgoing radio frequency signals and receive incoming radio frequency signals, such as voice and data signals, via an antenna. The antenna may be an embedded antenna, a retractable antenna or any antenna known to those having skill in the art without departing from the scope of the present invention. In particular embodiments, however, the antenna is configured to send and receive circularly polarized, linearly polarized and/or unpolarized signals in satellite frequency bands. The radio frequency signals transmitted between the radioterminal 10 and the other terminal(s) may include both traffic and control signals (e.g., paging signals/messages for incoming calls), which are used to establish and maintain communication with another party or destination.

Figure 7:
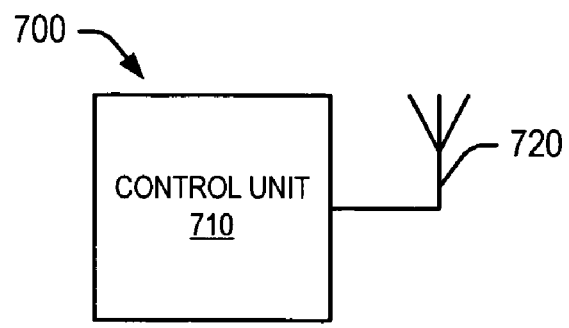
FIG. 7 is a block diagram of a satellite according to embodiments of the invention.

FIG. 7 illustrates, schematically, a satellite 700 according to some embodiments of the invention. In general, a satellite includes a control unit 710 and an antenna 720 configured to send/receive signals using a satellite frequency band. The control unit 710 may include one or more transceivers configured to send/receive signals over the antenna 720 simultaneously.

In general, there are at least three basic multiple access schemes: time division multiple access (TDMA), code division multiple access (CDMA) and frequency division multiple access (FDMA). In an FDMA scheme, different transmitters are assigned different frequency bands on which to transmit. In a TDMA system, different transmitters are assigned different time slots (i.e., time intervals) within a particular frequency band. Thus, in accordance with a TDMA system, a transmitter is assigned to a particular frequency band (as in FDMA), but temporally shares the frequency band in order to improve band utilization. In a general CDMA scheme, multiple transmitters share a single, relatively wide frequency band, but the transmitters may not be limited to particular time slots. Rather, each transmitter is assigned a unique spreading code (or "chipping" code) that is in some embodiments orthogonal to the spreading code used by each of the other transmitters. Information transmitted by each transmitter is modulated using the transmitter's spreading code.

A radioterminal and/or a satellite gateway according to some embodiments of the invention may include a dual mode communication module that is configured to transmit/receive signals using one or more communications protocols (such as FDMA, CDMA, TDMA, etc.) simultaneously and/or non-simultaneously. Accordingly, a radioterminal or satellite gateway according to some embodiments of the invention may receive a first information stream using a first communication protocol and a second information stream using a second communication protocol that is different from the first communication protocol. The radioterminal or satellite gateway may combine the first and second information streams to provide a combined information stream.

Figure 8:
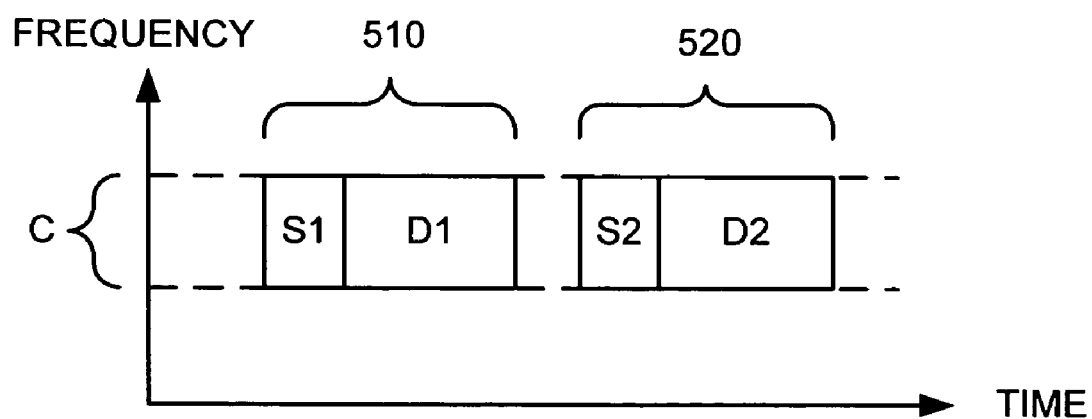
FIG. 8 is a graph illustrating communications on a first frequency band according to some embodiments of the invention.
Figure 9:
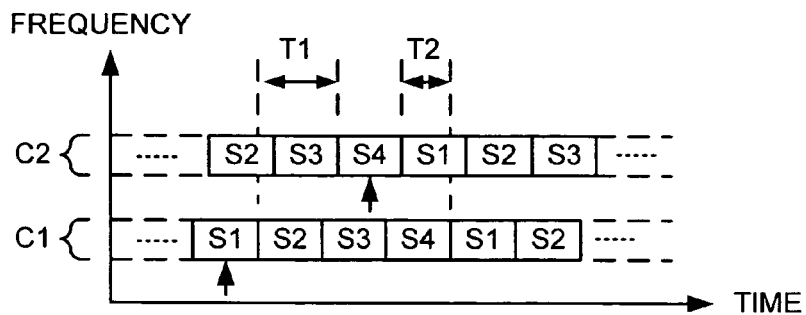
FIG. 9 is a graph illustrating communications in timeslots on multiple frequency bands according to some embodiments of the invention.

Some examples of transmission and reception of the first and second information streams to a destination radioterminal are illustrated in FIGS. 8 and 9, which are exemplary graphs of frequency versus time for a frequency division multiple access (FDMA) communications system and a time division multiple access (TDMA) communications system, respectively. For example, referring to FIG. 8, a downlink channel of a FDMA communications system may be assigned to a channel C having a predetermined bandwidth. The first and second information streams may be transmitted by first and second satellites, respectively, in bursts over the same channel C.

For example, the first satellite may send a first portion of the first information stream to the destination radioterminal and/or the satellite gateway in a first information burst 510, after which the second satellite may send a first portion of the second information stream to the destination radioterminal and/or the satellite gateway in a second information burst 520. The satellites may alternate sending information bursts to the destination radioterminal on the same channel C. The first information burst 510 may include a synchronization header S1 and a data field D1. The synchronization header S1 may permit the radioterminal to synchronize its receiver with the timing of the first information burst. Similarly, the second information burst 510 may include a synchronization header S2 and a data field D2. The synchronization header S2 may permit the radioterminal to synchronize its receiver with the timing of the second information burst. The satellites may alternate sending information bursts, and the destination radioterminal may re-synchronize to each information burst.

A time division multiple access (TDMA) scenario is illustrated in FIG. 9. As shown there, a TDMA system defines a plurality of channels C1, C2, each of which may be logically divided into a plurality of repeating time slots S1-S4. Each satellite may be assigned a time slot in the same or different channel, and the destination radioterminal and/or satellite gateway is configured to receive data on both time slots and combine the data to recover the original information stream. As illustrated in FIG. 9, the satellites may transmit on different channels in time slots that may be separated by a sufficient time interval to allow the destination radioterminal and/or satellite gateway to re-tune and re-synchronize between the time slots. For example, the first satellite may be assigned to transmit the first information stream using time slot S1 on channel C1, while the second satellite may be assigned to transmit the second information stream using time slot S4 on channel C2. The time interval between the end of the time slot S1 on channel C1 and the start of the time slot S4 on channel C2 is shown as T1, and the time interval between the end of the time slot S4 on channel C2 and the start of the time slot S1 on channel C1 is shown as T2. Both time intervals T1 and T2 may be long enough to permit the destination radioterminal and/or satellite gateway to retune its receiver to channel C1 or C2 and re-synchronize to the information stream transmitted thereon.

Figure 10:
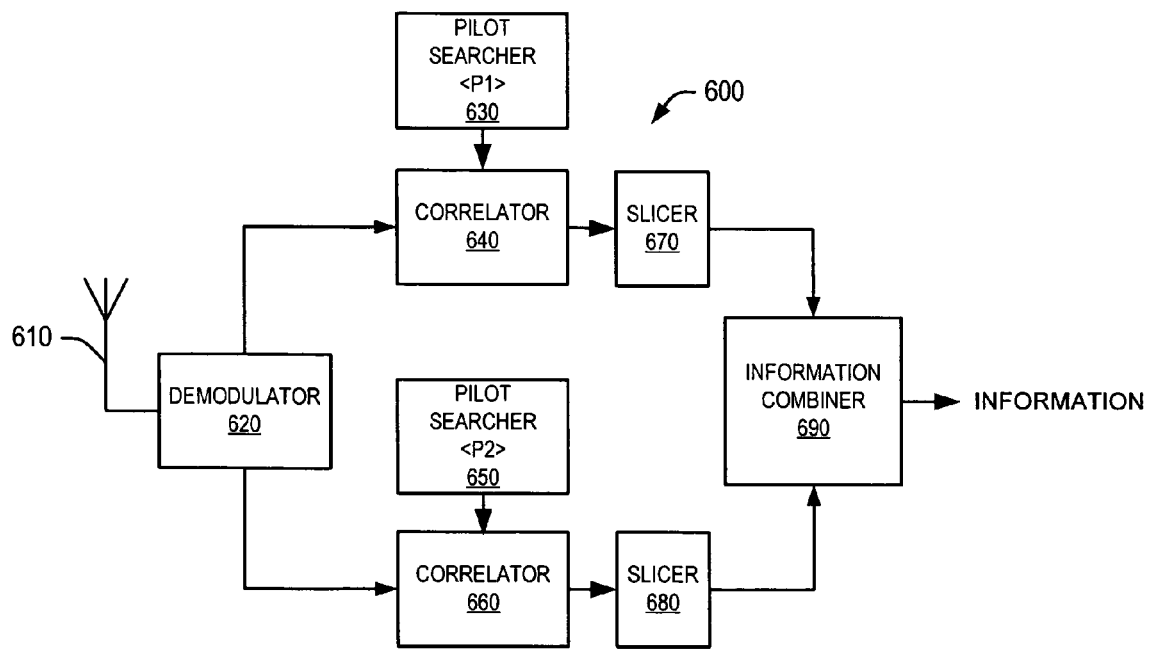
FIG. 10 is a block diagram of a receiver of a radioterminal according to some embodiments of the invention.

In a code division multiple access (CDMA) system, both the first and second information streams may be transmitted simultaneously in the same frequency space, but may be spread using different orthogonal spreading codes. For example, the first information stream transmitted by the first satellite may be transmitted using a first orthogonal spreading code, and the second information stream transmitted by the second satellite may be transmitted using a second orthogonal spreading code, different from the first orthogonal spreading code. In that case, the receiver of the destination radioterminal may be configured as shown in FIG. 10. As shown therein, a receiver 600 for a destination radioterminal and/or a satellite gateway may include an antenna 610 configured to receive communication signals in a CDMA frequency band. Received signals are provided to a demodulator 620, which converts the received signals to baseband. First and second pilot searchers 630, 650 are configured to search for pilot signals transmitted by the first and second satellites, respectively, in order to obtain timing information relative to information signals transmitted by the first and second satellites. The timing information is used by first and second correlators 640, 660 to correlate the received signals with known spreading codes used by the first and second satellites. The output of the correlators 640, 660 is passed though first and second slicers 670, 680, which respectively generate first and second received information streams that are combined in an information combiner 690 to provide a recovered information signal.

It will be understood by one skilled in the art that although the above description of embodiments including satellites is presented in terms of two satellites and two waveform components, more than two satellites and more than two respective waveform components may be used in some embodiments of the invention. It will also be appreciated by one skilled in the art that although satellites are used in the above description/embodiments to represent system elements, other system elements that are not satellites may be used in other embodiments, such as, for example, terrestrial transmitters (i.e., base stations), ancillary terrestrial components (ATCs), aeronautical transmitters on airborne platforms, etc.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of transmitting an information signal in a satellite communications system, the method comprising:
    splitting the information signal into a first signal component comprising a first bandwidth and a second signal component comprising a second bandwidth, wherein the first and second bandwidths differ therebetween;
    transmitting the first signal component to a first system element of the satellite communications system;
    transmitting the second signal component to a second system element of the satellite communications system;
    transmitting the first signal component from the first system element to the second system element;
    combining the first signal component with the second signal component at the second system element to form a combined signal; and
    transmitting the combined signal from the second system element to a destination receiver.

2. The method of claim 1, further comprising forming a waveform representative of the information signal; wherein splitting the information signal comprises splitting the waveform into a first waveform, and wherein transmitting the first signal component comprises transmitting the first waveform and transmitting the second signal component comprises transmitting the second waveform.

3. The method of claim 2, wherein splitting the waveform comprises filtering the waveform, and wherein transmitting the first waveform comprises modulating a first carrier signal with the first waveform and transmitting the modulated carrier signal to the first system component, and wherein transmitting the second waveform comprises modulating a second carrier signal with the second waveform and transmitting the modulated carrier signal to the second system component.

4. The method of claim 1, wherein a bandwidth of the combined signal exceeds a bandwidth capability of one of the first system element or the second system element.

5. The method of claim 1, wherein the information signal comprises a digital information signal, and wherein splitting the information signal comprises splitting the digital information signal into a first digital information stream and a second digital information stream; and
    wherein transmitting the first signal component comprises transmitting the first digital information stream to the first system element, and wherein transmitting the second signal component comprises transmitting the second digital information stream to the second system element.

6. The method of claim 5, further comprising interleaving and/or encoding the digital information signal prior to splitting the digital information signal into the first digital information stream and the second digital information stream.

7. The method of claim 1, wherein the first system element comprises a first satellite, the second system element comprises a second satellite, and the destination receiver comprises a radioterminal and/or a satellite gateway.

8. A communications system comprising:
    a waveform generator configured to generate a waveform representative of an information signal; and
    a waveform splitter configured to split the waveform into a first signal component comprising a first bandwidth and a second signal component comprising a second bandwidth, wherein the first and second bandwidths differ therebetween, configured to transmit the first signal component to a first system element of the communications system; and configured to transmit the second signal component to a second system element of the communications system, wherein the first system element comprises a first satellite and the second system element comprises a second satellite, wherein the first satellite is configured to transmit the first signal component and the second satellite is configured to transmit the second signal component, and wherein the second satellite is configured to receive the first signal component from the first satellite, and wherein the second satellite is further configured to combine the first signal component with the second signal component to form a combined signal and to transmit the combined signal to a destination receiver.

9. A communications system comprising:

a waveform generator configured to generate a waveform representative of an information signal;

a waveform splitter configured to split the waveform into a first signal component comprising a first bandwidth and a second signal component comprising a second bandwidth, wherein the first and second bandwidths differ therebetween; and a transmitter configured to transmit the first signal component to a first system element of the communications system, and configured to transmit the second signal component to a second system element of the communications system, wherein the first system element comprises a first satellite and the second system element comprises a second satellite, wherein the first satellite is configured to transmit the first signal component to the second satellite, and wherein the second satellite is configured to combine the first signal component with the second signal component, configured to recover the information signal from the first signal component that is combined with the second signal component, and configured to transmit the recovered information signal to a destination receiver.

10. A communications system comprising:

an information splitter configured to split an information signal into a first information signal component comprising a first bandwidth and a second information signal component comprising a second bandwidth, wherein the first and second bandwidths differ therebetween;

a first transmitter configured to transmit the first information signal component to a first system element of the communications system; and a second transmitter configured to transmit the second information signal component to a second system element of the communications system, wherein the first system element comprises a first satellite and the second system element comprises a second satellite, wherein the first satellite is configured to receive the first information signal component and to transmit the first information signal component to the second satellite, wherein the second satellite is configured to receive the second information signal component, and wherein the second satellite is configured to combine the first information signal component with the second information signal component, configured to recover the information signal from the first information signal component that has been combined with the second information signal component, and configured to transmit the recovered information signal to a destination receiver.

11. The communication system of claim 10, wherein the first satellite is configured to transmit the first information signal component in a transmission channel, and wherein the second satellite is configured to transmit the second information signal in the same transmission channel after the transmission of the first information signal component has finished.

12. The communications system of claim 10, wherein the first satellite is configured to transmit the first information signal component in a first time slot in a first transmission channel, and wherein the second satellite is configured to transmit the second information signal component in a second time slot in a second transmission channel.

13. The communications system of claim 12, wherein the first time slot of the first transmission channel and the second time slot of the second transmission channel are separated by a sufficient time interval to permit a receiver to tune between a frequency of the first transmission channel and a frequency of the second transmission channel.

* * * * *